United States Patent
Tsuboi

(10) Patent No.: US 7,432,799 B2
(45) Date of Patent: Oct. 7, 2008

(54) DRIVING SUPPORT APPARATUS AND DRIVING SUPPORT METHOD

(75) Inventor: Shoichi Tsuboi, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 208 days.

(21) Appl. No.: 11/263,533

(22) Filed: Oct. 31, 2005

(65) Prior Publication Data

US 2006/0119472 A1    Jun. 8, 2006

(30) Foreign Application Priority Data

Nov. 9, 2004  (JP)  .............................. 2004-324592

(51) Int. Cl.
*B60Q 1/00* (2006.01)
(52) U.S. Cl. ........................ 340/435; 340/436; 340/438; 340/425.5; 340/932.2; 340/933; 340/937; 348/142; 348/148; 348/151; 701/1; 701/23
(58) Field of Classification Search ................. 340/435, 340/436, 425.5, 932.2, 933, 937, 438; 348/142, 348/148, 150, 151; 701/1, 23, 36, 210, 310
See application file for complete search history.

(56) References Cited

U.S. PATENT DOCUMENTS

| | | | |
|---|---|---|---|
| 6,593,960 B1 | 7/2003 | Sugimoto et al. | ........... 348/148 |
| 6,633,811 B1 | 10/2003 | Aumayer | |
| 7,034,861 B2 * | 4/2006 | Okada et al. | .................. 348/36 |
| 7,068,289 B2 * | 6/2006 | Satoh et al. | .................. 345/629 |
| 7,069,128 B2 * | 6/2006 | Iwama | .......................... 701/36 |
| 7,218,758 B2 * | 5/2007 | Ishii et al. | .................... 382/104 |
| 2001/0008992 A1 | 7/2001 | Saito et al. | |
| 2003/0149526 A1 | 8/2003 | Zhou et al. | |
| 2004/0254729 A1 | 12/2004 | Browne et al. | |
| 2005/0113985 A1 | 5/2005 | Greene | |
| 2005/0278078 A1 | 12/2005 | Sterling | |
| 2006/0212222 A1 | 9/2006 | Miyoshi et al. | |

FOREIGN PATENT DOCUMENTS

JP    2001-114047    4/2001

* cited by examiner

*Primary Examiner*—Hung T. Nguyen
(74) *Attorney, Agent, or Firm*—Brinks Hofer Gilson & Lione

(57) ABSTRACT

By applying an observing-point conversion and s synthesis to images captured by respective cameras capturing the surroundings of a vehicle and by placing a figure representing the vehicle on the synthesized image, an overhead-image generating unit generates an image to be obtained when captured at an observing point above the vehicle, a figure representing the vehicle, and an overhead image showing the surroundings of the vehicle in an overhead viewing manner, and displays the overhead image on a display device via a display processing unit. When an obstacle is detected by obstacle sensors, the caution-image generating unit extracts an image of those stored in an image memory, in an area including a part of the vehicle and the obstacle, generate a caution image, and displays the caution image at a position on the overhead image via the display processing unit corresponding to the position of the obstacle.

10 Claims, 5 Drawing Sheets ent Application Publica-
DRIVING SUPPORT APPARATUS AND DRIVING SUPPORT METHOD

BACKGROUND OF THE INVENTION

1. Field of the Invention

The present invention relates to a technique for supporting a driver to drive a vehicle by providing an image capturing the surroundings of a vehicle to a driver.

2. Description of the Related Art

In a know technique for supporting a driver to drive a vehicle by providing an image capturing the surroundings of the vehicle, at least one camera for capturing the surroundings of the vehicle is mounted on the vehicle and an image captured by the corresponding camera is provided to an operator (i.e., the driver) (e.g., Japanese Unexamined Patent Application Publication 2002-328021).

In another known technique, by applying an observing-point conversion to images of the surroundings of a vehicle captured by a plurality of cameras, by synthesizing them into an image to be obtained when captured at an observing point above the vehicle, and by placing a figure representing the vehicle on the synthesized image, an overhead image representing the surroundings of the vehicle in an overhead viewing manner is generated and provided to an operator (e.g., Japanese Unexamined Patent Application Publication 2002-354468).

More particularly, in this technique, for example, when the vehicle moves backwards in a parking lot as shown in FIG. 5A, by capturing obliquely downward surroundings of the vehicle with wide angle cameras 501 and 502 installed at the front and rear and 503 and 504 at the right and left of the vehicle, by applying an observing-point conversion and a synthesis to the respectively captured images, an image viewing the parking lot from overhead is generated. Then, an image, as shown in FIG. 5B, is generated by placing a figure 511 representing the vehicle on an image 510 viewing the parking lot from overhead and is provided to the operator as an overhead image.

Instead of the plurality of cameras for generating such an overhead image, in another known technique, a camera capturing the entire circumference of the vehicle is provided.

According to the techniques for providing an operator with the overhead image, the overhead image allows the operator to intuitively grasp surrounding circumstances of the vehicle and the relationship between the vehicle and a body in the surroundings.

However, it is hard to grasp the distance between an actual vehicle and an obstacle in the surroundings from an overhead image. Hence, only with the overhead image, an operator has difficulty in determining, for example, whether the vehicle manages to go along the side of the obstacle with a hairbreadth. In addition, it is difficult to generate an overhead image so that the relationship between the figure representing the vehicle on the overhead image and the obstacle included in the image exactly agrees with that between an actual vehicle and an actual obstacle in the surroundings of the vehicle.

In particular, when a tall obstacle 520 exists in the vicinity of the vehicle as shown in FIGS. 5C and 5D, on an overhead image undergoing an observing-point conversion, the obstacle is displayed as a figure 521 occupying all of a certain angle range with respect to a camera capturing the obstacle, in a different manner from that of the case where, as shown in FIG. 5E, the surroundings of the vehicle are actually observed from above the vehicle. Hence, the operator is unable to intuitively and accurately grasp the position and the shape of such an obstacle from the overhead image.

SUMMARY OF THE INVENTION

Accordingly, it is an object of the present invention to provide a driving support apparatus for displaying an overhead image of the surroundings of a vehicle, allowing an operator to more accurately grasp the relationship between a vehicle and an obstacle in the surroundings of the vehicle.

According to one aspect of the present invention, a driving support apparatus mounted on a vehicle includes at least one surrounding-capturing camera capturing the surroundings of the vehicle; at least one obstacle detecting unit detecting an obstacle in the surroundings of the vehicle; a display device; an overhead-image generating unit converting the image captured by the surrounding-capturing camera and generating an overhead image of the surroundings of the vehicle viewed from above the vehicle; a display processing unit displaying the overhead image generated by the overhead-image generating unit on the display device; and an obstacle-surrounding-image generating unit generating an obstacle-surrounding image capturing the surroundings of the position of the obstacle detected by the obstacle detecting unit. The display processing unit displays the obstacle-surrounding image generated by the obstacle-surrounding-image generating unit around a position on the overhead image corresponding to the position of the obstacle detected by the obstacle detecting unit.

With such a driving support apparatus, in addition to an overhead image, an obstacle-surrounding image capturing the surroundings of an obstacle is displayed, thereby allowing a driver to more accurately grasp the relationship between the vehicle and the obstacle in the surrounding the vehicle, which is hard to grasp only from the overhead image. Also, since the obstacle-surrounding image is displayed around a position corresponding to the position of the obstacle on the overhead image, the obstacle-surrounding image represents what side of the vehicle, thereby allowing the driver to easily and institutively grasp the positional relationship between the obstacle and the vehicle.

According to another aspect of the present invention, a driving support apparatus mounted on a vehicle includes at least one surrounding-capturing camera capturing the surroundings of the vehicle; at least one obstacle detecting unit detecting an obstacle in the surroundings of the vehicle; a display device; an overhead-image generating unit converting the image captured by the surrounding-capturing camera and generating an overhead image of the surroundings of the vehicle viewed from above the vehicle; a display processing unit displaying the overhead image generated by the overhead-image generating unit on the display device; and an obstacle-surrounding-image generating unit generating an obstacle-surrounding image capturing the surroundings of the position of the obstacle when the obstacle detecting unit detects the obstacle. When the obstacle detecting unit detects the obstacle, the display processing unit displays the obstacle-surrounding image generated by the obstacle-surrounding-image generating unit on the display device. In this case, the display processing unit displays the obstacle-surrounding image around a position on the overhead image corresponding to the position of the obstacle detected by the obstacle detecting unit.

With such a driving support apparatus, while an overhead image is usually displayed, when an obstacle is detected, an obstacle-surrounding image capturing the surroundings of the obstacle is displayed in addition to the overhead image, thereby allowing a driver to more accurately grasp the relationship between the vehicle and the obstacle in the surroundings of the vehicle, which is hard to grasp from the overhead image. Also, since such an obstacle-surrounding image is displayed when the obstacle is detected, the visibility of the overhead image is not usually deteriorated by the obstacle-surrounding image.

Each of the foregoing driving support apparatuses may have a structure in which the obstacle-surrounding-image generating unit generates the obstacle-surrounding image from an image portion extracted from the image captured by the surrounding-capturing camera and capturing the surroundings of the obstacle. In this case, the visibility of the obstacle-surrounding image may be improved such that, when the obstacle detected by the obstacle detecting unit is located at the back of the vehicle, by generating the obstacle-surrounding image with the obstacle-surrounding-image generating unit in a manner of vertically and horizontally flipping the extracted image portion, the front and rear and the right and left of a driver watching at the obstacle-surrounding image while facing ahead of the vehicle agree with the top and bottom of the obstacle-surrounding image.

Advantages of the Present Invention

As described above, according to the present invention, an operator can more accurately grasp the relationship between a vehicle and an obstacle in the surroundings of the vehicle with a driving support apparatus displaying an overhead image of the surroundings of the vehicle.

DESCRIPTION OF THE PREFERRED EMBODIMENTS

Referring now to the attached drawings, embodiments of the present invention will be described.

Figure 1A:
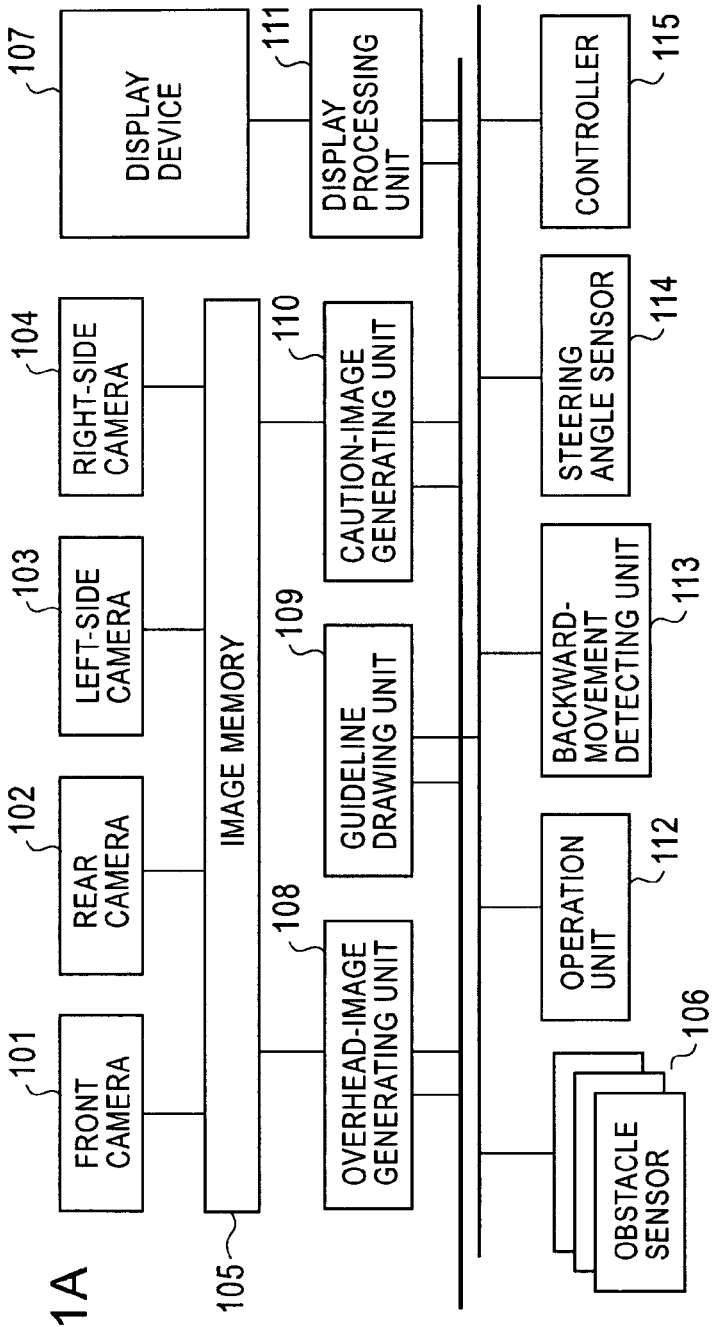
FIG. 1 is a block diagram of the structure of a driving support apparatus according to an embodiment of the present invention.
Figure 1B:
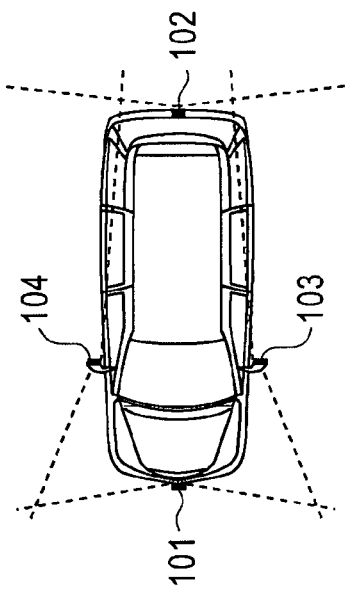

FIG. 1A is a block diagram of a driving support apparatus according to an embodiment of the present invention, and FIG. 1B shows four wide-angle cameras included in the driving support apparatus and mounted on a vehicle.

As shown in these figures, a driving support apparatus includes a front camera 101 capturing a forward and obliquely downward part of the surroundings of the vehicle, a rear camera 102 capturing a rearward and obliquely downward part of the surroundings of the vehicle, a left camera 103 capturing a leftward and obliquely downward part of the surroundings of the vehicle, a right camera 104 capturing a rightward and obliquely downward part of the surroundings of the vehicle, an image memory 105 holding images captured by the cameras, at least one obstacle sensor 106 corresponding to at least one obstacle detecting unit, a display device 107, an overhead-image generating unit 108, a guideline drawing unit 109, a caution-image generating unit 110 corresponding to an obstacle-surrounding-image generating unit, a display processing unit 111 controlling display of the display device 107, an operation unit 112 accepting an operation of an operator, a backward-movement detecting unit 113 detecting whether the vehicle is in a backward moving state (a back-gear selected state) in accordance with an operator's gear operation of a transmission of the vehicle, a steering angle sensor 114 detecting a steering angle of a steering wheel in accordance with an operator's steering operation, and a controller 115.

The at least one obstacle sensor 106 detects an obstacle within the capturing range of the corresponding camera. In the case of a plurality of the obstacle sensors 106, for example, four radar sensors are installed in the vicinities of the corresponding cameras 101 to 104.

Figure 2B:
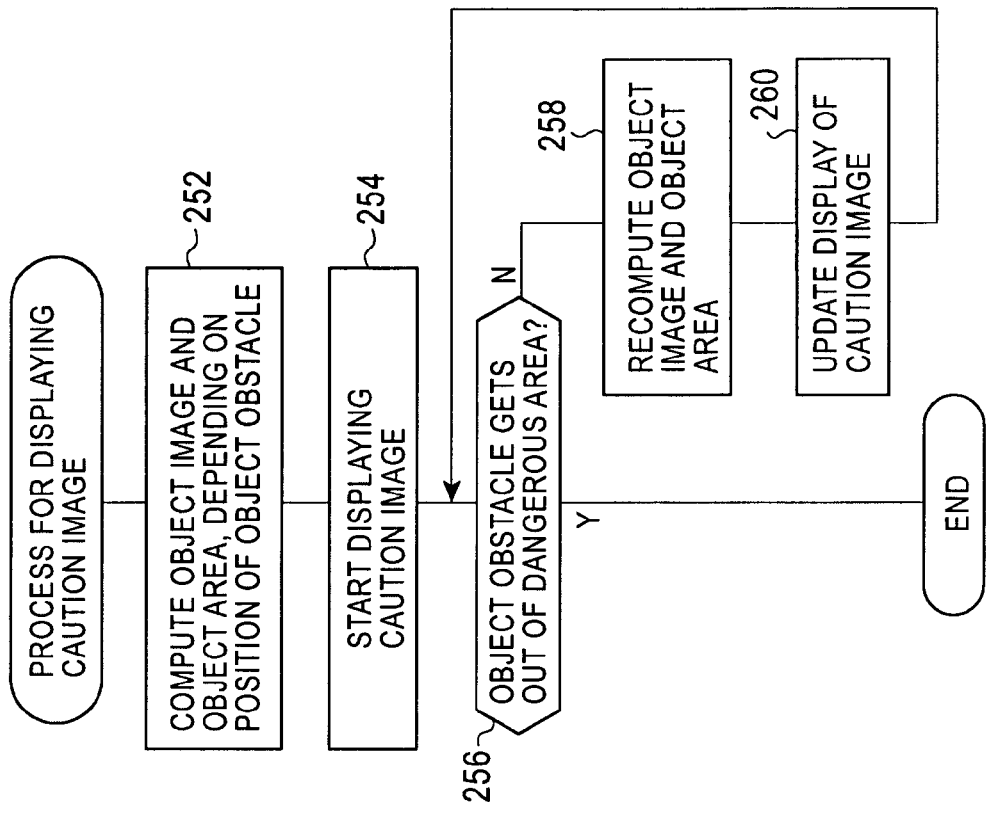
FIG. 2 is a flowchart of a process carried out by the driving support apparatus according to the embodiment.
Figure 2A:
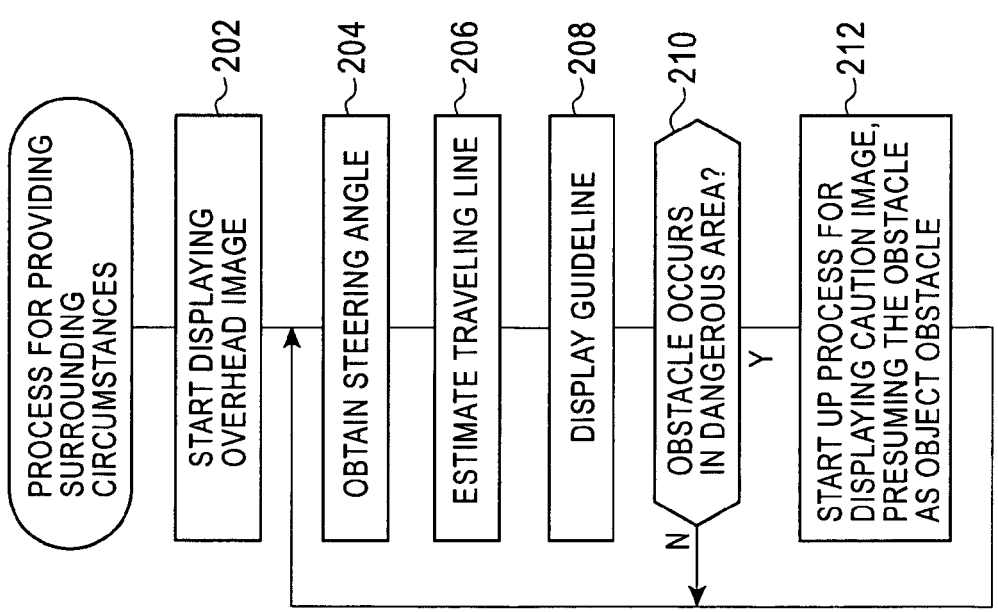

An operation of such a driving support apparatus will be described. FIG. 2A is a flowchart of a process for providing the surrounding circumstances of the vehicle, carried out by the controller 115. The process is started up and carried out when the operator instructs an operation for providing the surrounding circumstances with a predetermined operation of the operation unit 112 or the backward-movement detecting unit 113 detects a backward moving state of the vehicle.

As show in the figure, the process starts with controlling the overhead-image generating unit 108 so as to start overhead image display (step 202). Upon start of the overhead image display, by applying an observing-point conversion and a synthesis to images captured by the respective cameras 101 to 104 and stored in the image memory 105 so as to generate an image to be obtained when captured at an observing point above the vehicle and also by placing a figure representing the vehicle on the synthesized image, the overhead-image generating unit 108 generates an overhead image showing the surroundings of the vehicle together with the figure and sends them to the display processing unit 111. Also, upon start of the overhead image display, the display processing unit 111 displays the overhead image sent from the overhead-image generating unit 108, on the display device 107.

Then, the controller 115 obtains a steering angle from the steering angle sensor 114 (step 204). If the steering angle agrees with the present value, the controller 115 estimates a traveling lines along which the vehicle is to travel (step 206) and starts displaying guidelines for guiding the estimated traveling lines. (step 208).

Upon start of displaying the guidelines, the guideline drawing unit 109 generates a guideline image for guiding the guidelines on the overhead image and sends it to the display processing unit 111. Also, upon start of displaying the guidelines, the display processing unit 111 overlays the guideline image sent from the guideline drawing unit 109, on the overhead image displayed on the display device 107.

Figure 3A:
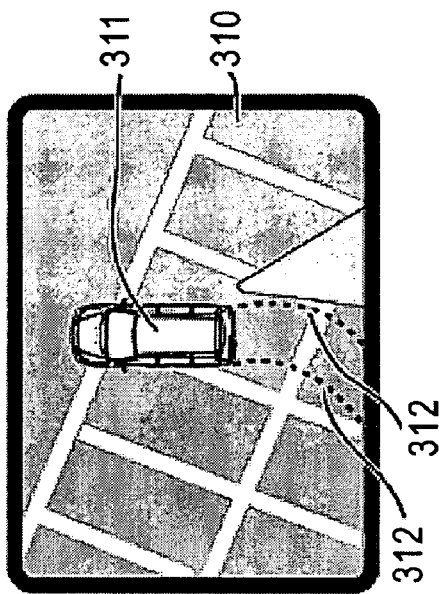
FIG. 3 shows an example operation of the driving support apparatus according to the embodiment.
Figure 3B:
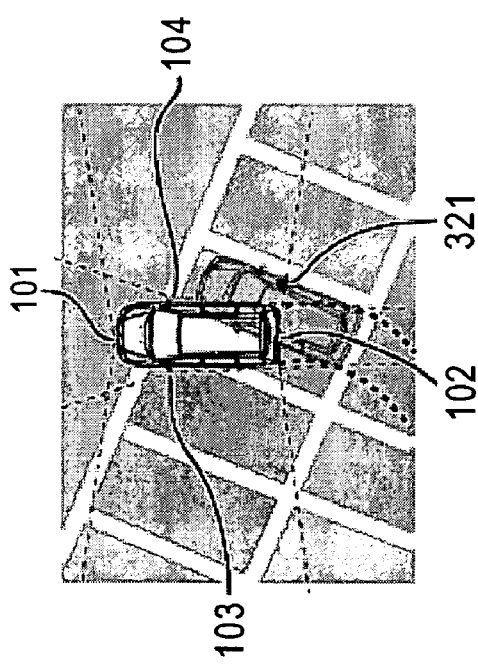

As a result, for example, when the vehicle moves backwards in a parking lot as shown in FIG. 3A, as shown in FIG. 3B, an overhead image obtained by placing a figure 311 representing the vehicle on an image 310, which views the parking lot from above in a bird's-eye viewing manner and which is generated by applying an observing-point conversion and a synthesis to images captured by the respective cameras 101 to 104, is displayed on the display device 107 together with guidelines 312 representing the traveling lines of the vehicle and provided to the operator.

Referring back to FIG. 2A, when display of the overhead image and the guidelines is started as described above, the controller 115 checks whether an obstacle exists in a dangerous area while referring to the outputs of the obstacle sensors 106 (step 210). Meanwhile, the dangerous area means any one of the following areas: (1) an area within a predetermined distance away from the vehicle (e.g., 20 cm), (2) an area in which, when the vehicle travels along the traveling lines estimated in step 206 and if an obstacle exists, the obstacle collides with the vehicle or comes close to the vehicle within a predetermined distance (e.g., 20 cm) and (3) an area in which, when a door of the vehicle is opened at this time and if an obstacle exists, the obstacle collides with the door.

When no obstacle exits in the dangerous area, the process returns to step 204, and the controller 115 re-mates estimates the traveling lines and updates the guidelines to be displayed. When an obstacle exists in the dangerous area, a process for displaying a caution image while presuming the obstacle is an object obstacle is started up (step 212). Then, the process returns to step 204, and the controller 115 re-estimates the traveling lines and updates the guidelines. As a result, for example, when an obstacle 321 exists as shown in FIG. 3A, with which the vehicle is to collide if traveling along the traveling lines, the process for displaying an caution image while presuming the obstacle 321 as an object obstacle is started up and executed concurrently with the process for providing the surrounding circumstances of the vehicle.

Subsequently, the process started up in step 212, for displaying a caution image, will be described. FIG. 2B illustrates a procedure of the process for displaying a caution image.

As shown in the figure, in this process, on the basis of positions of an object obstacle detected by the obstacle sensors 106, an image captured by one of the four cameras 101 to 104, most satisfactorily capturing the object obstacle therein is presumed as an object image, and, in the object image, an area having the obstacle captured therein is computed (step 252). Then, caution image display is started (step 254), and tracking the position of the object image is also started on the basis of the outputs of the obstacle sensors 106.

Upon start of the caution image display, the caution-image generating unit 110 reads the computed object image from the image memory 105, an image in an area including both a part of the vehicle and an image of the obstacle is extracted as a display object image from the computed object image, the distortion and the orientation of the extracted display object image is corrected, the size of the corrected display object image is adjusted to meet a predetermined size, and the display object image is sent to the display processing unit 111 as a caution image. In other words, the caution-image generating unit 110 corrects the distortion of the display object image so that the display object image shows a part of the vehicle and the object obstacle in the same proportion as viewed by human eyes. When the display object image is captured by the rear camera 102, the right camera 104, or the left camera 103, the display object image is horizontally flipped. In particular, when the display object image is captured by the rear camera 102, the display object image may be additionally vertically flipped.

The display processing unit 111 displays the caution image generated by the caution-image generating unit 110 while overlaying it on the overhead image as described above. On this occasion, the caution image is displayed at a position on the overhead image, corresponding to that of the object obstacle.

More particularly, the following cases are presumable by way of example.

(a) When the object obstacle is located at the right rear of the vehicle, the caution image is displayed within the frame of the overhead image and at a position on the overhead image corresponding to the object obstacle, to which the upper left corner of the caution image is located closest.
(b) When the object obstacle is located at the right front of the vehicle, the caution image is displayed within the frame of the overhead image and at a position on the overhead image corresponding to the object obstacle, to which the lower left corner of the caution image is located closest.
(c) When the object obstacle is located at the left rear of the vehicle, the caution image is displayed within the frame of the overhead image and at a position on the overhead image corresponding to the object obstacle, to which the upper right corner of the caution image is located closest.
(d) When the object obstacle is located at the left front of the vehicle, the caution image is displayed within the frame of the overhead image and at a position on the overhead image corresponding to the object obstacle, to which the lower right corner of the caution image is located closest.
(e) When the object obstacle is located at the rear of the vehicle, the caution image is displayed within the frame of the overhead image and at a position on the overhead image corresponding to the object obstacle, to which the upper center of the caution image is located closest.
(f) When the object obstacle is located in front of the vehicle, the caution image is displayed within the frame of the overhead image and at a position on the overhead image corresponding to the object obstacle, to which the lower center of the caution image is located closest.

Alternatively, the caution image may be located at a position previously determined so as to correspond to the position of the object obstacle, i.e., in front, at the rear, at the right, at the left, at the right front, at the right rear, at the right rear, at the left front, at the left rear, or at the right rear of the vehicle. The caution-image generating unit 110 also displays an outgoing line linking one of the cameras capturing the caution image with the caution image.

Now back to FIG. 2B, when the caution image display is started up as described above, the controller 115 monitors, on the basis of the position of the tracking object obstacle, whether the object obstacle gets out of the dangerous area (step 256). If YES, the controller 115 finishes display of the caution image and the process ends. If NO, the controller 115 repeats updating the caution image (step 260) by re-computing the object image and the object area, on the basis of the position of the tracking object obstacle, until the object obstacle gets out of the dangerous area (step 258).

The operation of the driving support apparatus has been described.

Figure 3C:
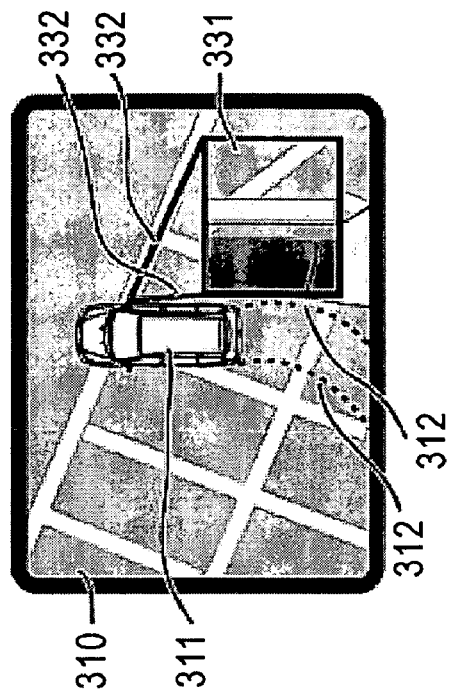

According to such an operation of the driving support apparatus, for example, when the obstacle 321 exists in the capturing area of the right rear side camera 104 as shown in FIG. 3A, with which the vehicle is to collide if the vehicle moves along the traveling lines, with the process started up for displaying a caution image while presuming the obstacle as an object obstacle, a caution image 331 capturing the obstacle 321 and a part of the vehicle and taken by the right camera 104 is displayed as shown in FIG. 3C, around a position having the obstacle captured thereat and located on the overhead image, obtained from the image 310 and the figure 311 representing the vehicle, together with an outgoing line 332 extending from a position of the figure 311, corresponding to the right camera 104.

In this case, since the caution image 331 is displayed in a manner of horizontally flipping the corresponding image captured by the right camera 104, the right and left of the operator watching the caution image 331 while facing ahead of the vehicle agree with those of the caution image 331. That is, when captured at the right of the part of the vehicle in the caution image 331, the obstacle 321 exists at the right of the operator driving an actual vehicle.

Figure 4A:
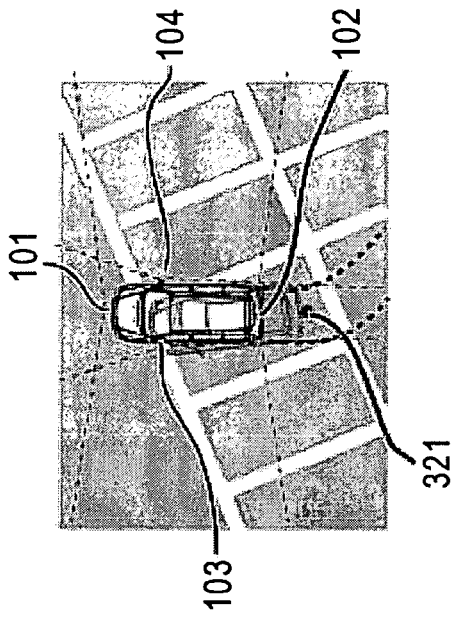
FIG. 4 shows another example operation of the driving support apparatus according to the embodiment.
Figure 4C:
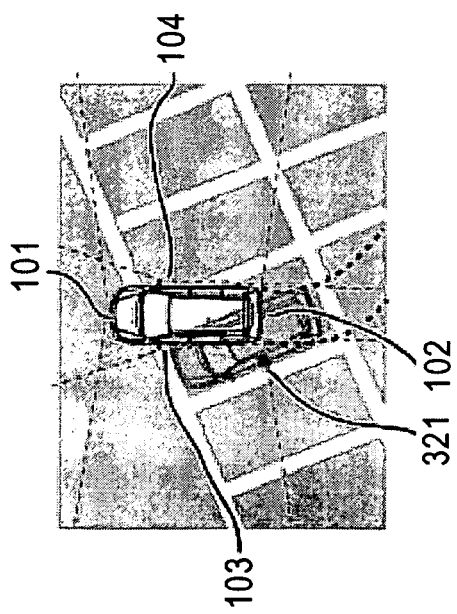
Figure 4E:
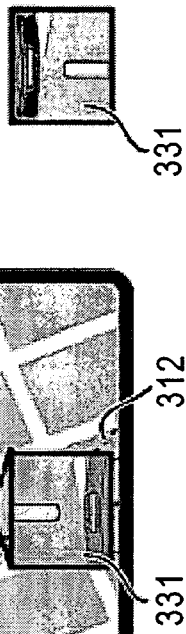
Figure 4D:
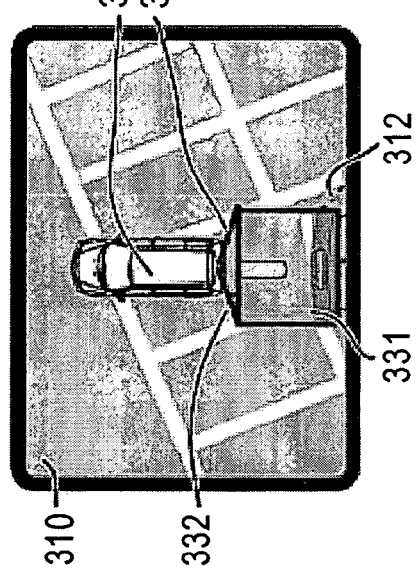
Figure 4B:
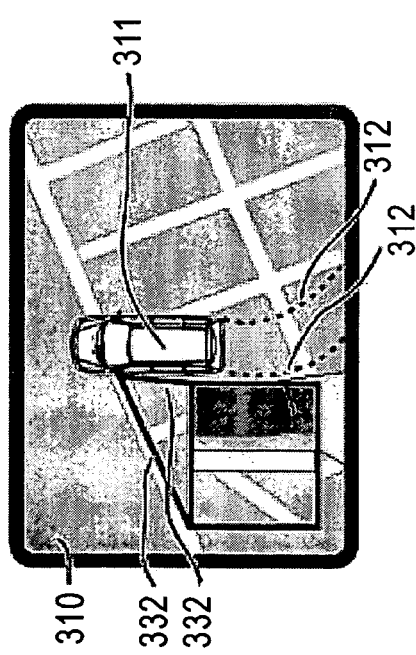
Figure 5A:
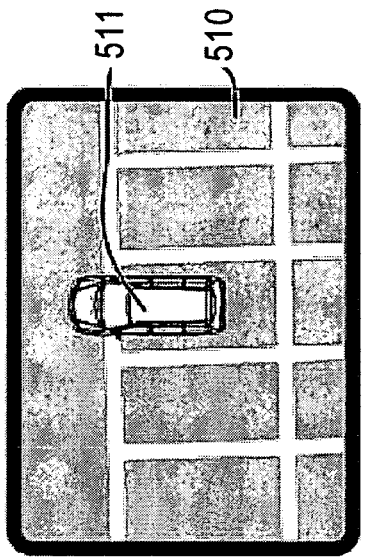
FIG. 5 shows an operation of a known driving support apparatus.
Figure 5B:
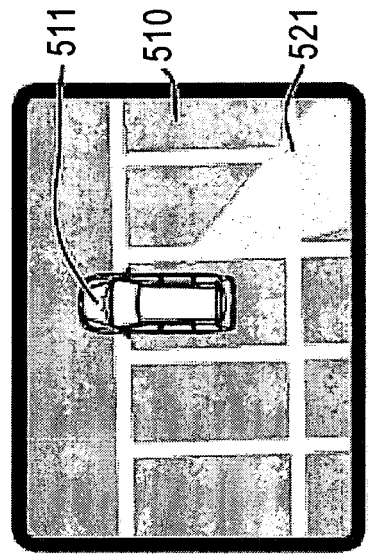
Figure 5D:
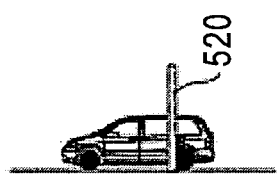
Figure 5C:
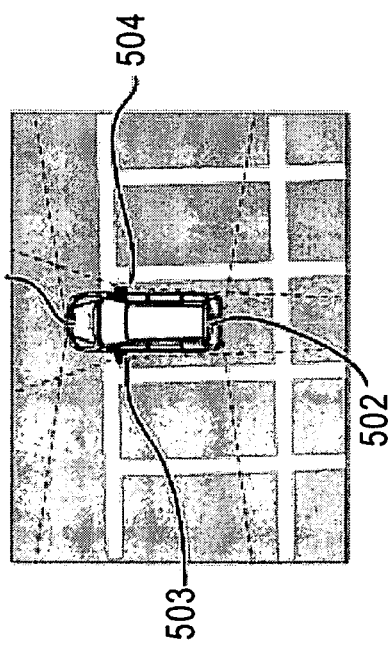
Figure 5E:
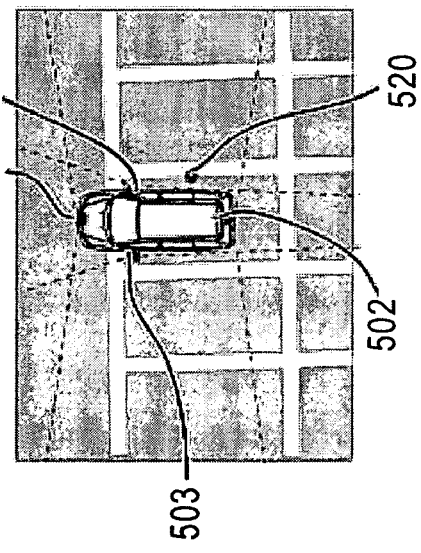

Likewise, for example, when the obstacle 321 exists in the capturing area of the left rear camera 103 as shown in FIG. 3A, with which the vehicle is to collide if the vehicle moves along the traveling lines, with the process started up for displaying a caution image while presuming the obstacle as an object obstacle is started up, the caution image 331 capturing the obstacle 321 and a part of the vehicle and taken by the left camera 103 is displayed as shown in FIG. 4B, around a position having the obstacle captured thereat and located on the overhead image, obtained from the image 310 and the figure 311 representing the vehicle, together with another outgoing line 332 extending from a position of the figure 311, corresponding to the left camera 103. Also, in this case, since the caution image 331 is displayed in a manner of horizontally flipping the corresponding image captured by the left camera 103, the right and left of the operator watching the caution image 331 while facing ahead of the vehicle agree with those of the caution image 331.

Also, when the obstacle 321 exists in the capturing area of the rear camera 102 as shown in FIG. 4C, with which the vehicle is to collide if the vehicle moves along the traveling lines, with the process started up for displaying a caution image while presuming the obstacle as an object obstacle, the caution image 331 capturing the obstacle 321 and a part of the vehicle and taken by the rear camera 102 is displayed as shown in FIG. 4D, around a position having the obstacle captured thereat and located on the overhead image, obtained from the image 310 and the figure 311 representing the vehicle, together with another outgoing line 332 extending from a position corresponding to the rear camera 102, of the figure 311 representing the own vehicle. Also, in this case, since the caution image 331 is displayed in a manner of horizontally flipping the corresponding image captured by the rear camera 102, the right and left of the operator watching the caution image 331 while facing ahead of the vehicle agree with those of the caution image 331. Meanwhile, when a display object image is captured by the rear camera 102, and a caution image is generated by vertically flipping the display object image with the caution-image generating unit 110 in addition to the horizontally flipping processing, the caution image is made as shown in FIG. 4E. In this case, the upper part of the caution image agrees with the front of the operator watching the caution image 331 while facing ahead of the vehicle.

The embodiment of the present invention has been described. While the surroundings of the vehicle is captured by a plurality of the cameras captures according to the present embodiment, instead of this arrangement, the surroundings of the vehicle may be captured by a single camera capturing the entire circumference of the vehicle. Alternatively, only a part of the surroundings of the vehicle such as the rear and the right and left rear of the vehicle may be captured by the cameras.

Also, the camera capturing an image for use in generating a caution image may be independently installed from that for use in generating an overhead image. While the obstacle sensors 106 detecting an obstacle in the surroundings of the vehicle are independently installed from the cameras capturing the surroundings of the vehicle according to the foregoing embodiments, instead of this arrangement, the obstacle in the surroundings of the vehicle may be detected by applying an image recognition process to images captured by the cameras without additionally installing the obstacle sensors.

As described above, according to the present embodiment, while an overhead image is usually displayed, when an obstacle is detected, a caution image capturing the surroundings of the obstacle is displayed in addition to the overhead image, thereby allowing an operator to more accurately grasp the relationship between the vehicle and the obstacle in the surrounding the vehicle, which is hard to grasp only from the overhead image. Also, since such a caution image is displayed only when the obstacle is detected, the caution image does not usually cause deterioration of the visibility of the overhead image. In addition, since the caution image is displayed around a position corresponding to the position of the obstacle on the overhead image, this indicates that the caution image is located at what side of the vehicle, thereby allowing the driver to easily and institutively the positional relationship between the obstacle captured in the caution image and the own vehicle.

What is claimed is:

1. A driving support apparatus mounted on a vehicle, comprising:
    at least one camera operable to capture surroundings of a vehicle in an image;
    at least one obstacle detecting unit operable to detect an obstacle located within the surroundings of the vehicle, wherein the obstacle detecting unit detects the obstacle by transmitting and receiving one or more signals;
    a first image generating unit operable to generate, from the image captured by the camera, an overhead image of the surroundings of the vehicle as viewed from above the vehicle;
    a display device operable to display the overhead image;
    a second image generating unit operable to generate an object image from a portion of an image taken by the camera, wherein the object image captures a portion of the detected obstacle and a part of the surroundings of the detected obstacle,
    wherein the display device displays the object image capturing the portion of the detected obstacle and the part of the surroundings of the detected obstacle overlaid upon the overhead image, at a position within the overhead image corresponding to a location of the detected obstacle in the overhead image;
    wherein the second image generating unit is operable to compute the object image from a portion of the image extracted from the camera, and adjust the size and orientation of the object image, wherein the object image captures the portion of the detected object and a portion of the vehicle; and
    wherein when the obstacle detected is located rearward of the vehicle, the second image generating unit is operable to generate the object image from the portion of the image captured by the camera, and vertically and horizontally flip the extracted image portion such that the orientation of the object image corresponds to the orientation of the overhead image of the surroundings of the vehicle, as viewed by a user of the driving support apparatus.

2. A driving support apparatus mounted on a vehicle, comprising:
    a plurality of cameras mounted to a vehicle, wherein the cameras are operable to capture surroundings of the vehicle in an image;
    at least one obstacle detecting unit operable to detect an obstacle within the surroundings of the vehicle, wherein the obstacle detecting unit detects the obstacle by transmitting and receiving one or more signals;
    a first image generating unit operable to generate, from the image captured by the camera, an overhead image of the surroundings of the vehicle as viewed from above the vehicle;
    a second image generating unit operable to select an image that shows the detected obstacle from among the images captured by the cameras, and extract a portion of the image that shows the detected obstacle as an obstacle image; and a display device operable to display the overhead image, along with the extracted obstacle image overlaid upon the overhead image;

wherein the display device is operable to display the obstacle image overlaid upon the overhead image at a position in the overhead image corresponding to a location of the detected obstacle in the overhead image;

wherein the second image generating unit is operable to compute the obstacle image from a portion of an image captured by the camera; and wherein the second image generating unit is operable to compute the obstacle image by horizontally and vertically flipping the extracted image portion when the object image is displayed on the display device, such that the orientation of the object image corresponds to the orientation of the overhead image of the surroundings of the vehicle, as viewed by a user of the driving support apparatus.

3. The driving support apparatus according to claim 2, wherein, when the obstacle is detected, the second image generating unit is operable to compute the obstacle image by vertically and horizontally flipping the extracted image portion.

4. The driving support apparatus according to claim 2, wherein if the obstacle is located within an area such that when a door of the vehicle is opened, the door collides with the obstacle, the display processing unit is operable to display the obstacle image superimposed upon the overhead image.

5. The driving support apparatus according to claim 2, wherein the display processing unit is operable to display at least one guideline representing a vehicle travel path along which the vehicle is expected to travel superimposed upon the overhead image.

6. The driving support apparatus according to claim 5, wherein if the obstacle is located along or within a predetermined distance from the vehicle travel path, the display processing unit is operable to display the obstacle image superimposed upon the overhead image.

7. A driving support method for supporting a driver to avoid an obstacle with a driving support apparatus in which an overhead image of the surroundings of a vehicle viewed from above the vehicle is generated and displayed by converting an image capturing the surroundings of the vehicle, the method comprising:

transmitting and receiving a signal to detect an obstacle within surroundings of a vehicle;

generating, when the obstacle is detected, an obstacle image from a portion of an image extracted from an overhead image of the vehicle capturing the detected obstacle and a part of the surroundings of the detected obstacle;

displaying the overhead image on a display device;

overlaying the obstacle image upon the displayed overhead image at a position within the overhead image corresponding to a location of the detected obstacle relative to the vehicle; and flipping the extracted image portion vertically and horizontally, such that the orientation of the obstacle image corresponds to the orientation of the overhead image of the surroundings of the vehicle, when the object image is overlaid on the displayed overhead image.

8. The driving support method according to claim 7, the method further comprising, superimposing a guideline representing a vehicle travel path along which the vehicle is expected to travel upon the displayed overhead image.

9. The driving support method according to claim 7, wherein the display processing unit is operable to display the obstacle image superimposed upon the overhead image if the obstacle is located along or within a predetermined distance from a vehicle travel path along which the vehicle is expected to travel.

10. The driving support method according to claim 7, wherein the display processing unit is operable to display the obstacle image superimposed upon the overhead image if it is determined that any portion of the vehicle is expected to collide with the obstacle.

* * * * *